(12) United States Patent
Sworen et al.

(10) Patent No.: US 9,845,410 B2
(45) Date of Patent: *Dec. 19, 2017

(54) WAX AND URETHANE BASED EXTENDER BLENDS FOR SURFACE EFFECT COMPOSITIONS

(71) Applicant: THE CHEMOURS COMPANY, FC, LLC, Wilmington, DE (US)

(72) Inventors: John Christopher Sworen, Chadds Ford, PA (US); Gerald Oronde Brown, Wilmington, DE (US); Tatsiana Haidzinskaya, Newark, DE (US); Ewa M. Kohler, West Chester, PA (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 23 days.

This patent is subject to a terminal disclaimer.

(21) Appl. No.: 14/727,928

(22) Filed: Jun. 2, 2015

(65) Prior Publication Data
US 2015/0361300 A1  Dec. 17, 2015

Related U.S. Application Data

(60) Provisional application No. 62/011,088, filed on Jun. 12, 2014, provisional application No. 62/055,930, filed on Sep. 26, 2014.

(51) Int. Cl.
| | | |
|---|---|---|
| *C09D 175/12* | (2006.01) | |
| *C08G 18/28* | (2006.01) | |
| *C09D 175/04* | (2006.01) | |
| *D06M 15/564* | (2006.01) | |
| *C09D 191/06* | (2006.01) | |
| *C08G 18/79* | (2006.01) | |
| *D21H 27/30* | (2006.01) | |
| *D21H 11/16* | (2006.01) | |

(52) U.S. Cl.
CPC ......... *C09D 175/12* (2013.01); *C08G 18/284* (2013.01); *C08G 18/2825* (2013.01); *C08G 18/792* (2013.01); *C09D 175/04* (2013.01); *C09D 191/06* (2013.01); *D06M 15/564* (2013.01); *D21H 11/16* (2013.01); *D21H 27/30* (2013.01)

(58) Field of Classification Search
CPC .................................................. C09D 175/12
USPC ....................................................... 524/279
See application file for complete search history.

(56) References Cited

U.S. PATENT DOCUMENTS

| | | |
|---|---|---|
| 3,049,513 A | 8/1962 | Damusis |
| 3,505,001 A | 4/1970 | Wagner |
| 3,708,327 A | 1/1973 | Tomasino et al. |
| 4,254,228 A | 3/1981 | Kleimann et al. |
| 4,304,683 A | 12/1981 | Morinaka et al. |
| 4,360,447 A | 11/1982 | Morinaka et al. |
| 6,524,978 B1 * | 2/2003 | Moore ............... C08G 18/0828 428/95 |
| 6,864,312 B2 | 3/2005 | Moore |
| 7,056,845 B2 | 6/2006 | Waeber et al. |
| 7,223,478 B2 | 5/2007 | Treiber et al. |
| 7,344,758 B2 | 3/2008 | Franchina et al. |
| 7,601,776 B2 | 10/2009 | Kim et al. |
| 8,349,986 B2 | 1/2013 | Rukavina et al. |
| 8,586,697 B2 | 11/2013 | Elizalde et al. |
| 2002/0102382 A1 * | 8/2002 | Kwong ............. C08G 18/0866 428/96 |
| 2003/0120101 A1 | 6/2003 | Lai |
| 2003/0219613 A1 * | 11/2003 | Boylan ................ C09D 129/04 428/523 |
| 2005/0085573 A1 | 4/2005 | Sandner et al. |
| 2006/0052556 A1 | 3/2006 | Franchina et al. |
| 2006/0151739 A1 | 7/2006 | Sandner et al. |
| 2007/0009663 A1 | 1/2007 | Wang et al. |
| 2007/0122372 A1 * | 5/2007 | Danner ................ C08G 77/388 424/70.122 |
| 2007/0167601 A1 | 7/2007 | Rukavina et al. |
| 2008/0146750 A1 | 6/2008 | Corn et al. |
| 2010/0124649 A1 | 5/2010 | Rukavina et al. |
| 2010/0190397 A1 | 7/2010 | Duschek et al. |
| 2013/0288066 A1 | 10/2013 | Reiners et al. |
| 2014/0031483 A1 | 1/2014 | Elizalde et al. |
| 2016/0090508 A1 | 3/2016 | Sworen et al. |
| 2016/0090509 A1 | 3/2016 | Sworen et al. |
| 2016/0090560 A1 | 3/2016 | Sworen et al. |

FOREIGN PATENT DOCUMENTS

| | | |
|---|---|---|
| CA | 2142699 | 8/1993 |
| CN | 101781515 | 7/2010 |
| CN | 101914185 | 12/2010 |
| CN | 102965931 | 3/2013 |
| CN | 103194180 | 7/2013 |
| DE | 2307589 | 2/1973 |
| DE | 69322647 | 8/1993 |
| EP | 0656079 B1 | 12/1996 |
| EP | 2415879 A1 | 2/2012 |
| GB | 887387 | 1/1962 |
| GB | 1032367 | 12/1962 |
| GB | 1360007 | 7/1974 |
| JP | 47003477 | 1/1972 |
| JP | 48004940 | 2/1973 |
| JP | 75335811 | 9/1978 |
| JP | 58079008 | 5/1983 |
| JP | 1985045678 | 3/1985 |
| JP | 05331130 | 12/1993 |
| JP | 08246355 | 9/1996 |
| JP | 08311774 | 11/1996 |

(Continued)

OTHER PUBLICATIONS

Mao et al., Effect of Additives on Microstructgure and Properties of Polyurethane Coating Film for Fabrics, Fangzhi Gongye Chubanshe Journal, 1996, 17(2), Abstract.

(Continued)

*Primary Examiner* — Doris L Lee

(57) ABSTRACT

A method of treating a substrate comprising contacting the substrate with a composition comprising i) a wax which provides a surface effect and ii) a polymer extender composition comprising a urethane based compound, a composition for treating a substrate, and treated substrates thereof.

23 Claims, No Drawings

(56) References Cited

FOREIGN PATENT DOCUMENTS

| | | |
|---|---|---|
| JP | 10025664 | 1/1998 |
| JP | 100237478 | 9/1998 |
| JP | 2851814 | 11/1998 |
| JP | 3465980 | 8/2003 |
| JP | 2008207444 | 2/2007 |
| KR | 100635998 | 10/2006 |
| KR | 2009002894 | 1/2009 |
| WO | 200037525 A1 | 6/2000 |
| WO | 2003089477 A1 | 10/2003 |
| WO | 2006024669 A1 | 3/2006 |
| WO | 2006040333 A1 | 4/2006 |
| WO | 2009015136 A1 | 1/2009 |
| WO | 2011124710 | 10/2011 |
| WO | 2014160906 A2 | 10/2014 |

OTHER PUBLICATIONS

International Search Report and Written Opinion, PCT/US2015/033639, dated Sep. 8, 2015.

* cited by examiner

WAX AND URETHANE BASED EXTENDER BLENDS FOR SURFACE EFFECT COMPOSITIONS

FIELD OF THE INVENTION

Hydrocarbon polymers are employed as extenders to improve the performance of wax treating agents which provide surface effects to treated substrates.

BACKGROUND OF THE INVENTION

Various compositions are known to be useful as treating agents to provide surface effects to substrates, particularly for fibrous substrates such as fibers, fabrics, textiles, carpets, paper, leather and other such substrates. For example, fluorinated polymer compositions having utility as fibrous substrate treating agents generally contain pendant perfluoroalkyl groups of three or more carbon atoms, which provide oil- and water-repellency when the compositions are applied to fibrous substrate surfaces. The perfluoroalkyl groups are generally attached by various connecting groups to polymerizable groups not containing fluorine. The resulting monomer is then generally copolymerized with other monomers which confer additional favorable properties to the substrates. These polymers are generally marketed as aqueous emulsions for easy application to the fibrous substrates.

Attempts have been made to increase the oil- and water-repellency imparted to the substrate and its durability while reducing the amount of fluorinated polymer required, i.e., boost the efficiency or performance of the treating agent. Another approach employs use of various extender polymers. These are typically hydrocarbon polymers in aqueous emulsions, which are blended with the fluorinated polymer emulsion before application to the substrate. As an alternative to fluorinated materials, waxes and wax blends have been used to provide water repellency to substrates.

U.S. Pat. No. 7,344,758 discloses an emulsion suitable for imparting oil and/or water-repellency to substrates, containing a fluorinated acrylate copolymer.

BRIEF SUMMARY OF THE INVENTION

There is a need for polymer compositions which significantly improve the surface effects of wax treating agents. In particular, there is a need for compositions which improve the durability of surface effects for substrates while reducing or eliminating the amount of fluorinated materials required. The present invention provides such a composition.

The present invention comprises a method of treating a substrate comprising contacting the substrate with a composition comprising i) a wax and ii) a polymer extender composition comprising a compound prepared by:
(i) reacting (a) at least one isocyanate group-containing compound selected from isocyanate, diisocyanate, polyisocyanate, or mixtures thereof, and (b) at least one isocyanate-reactive compound selected from formula (Ia), (Ib), or (Ic):

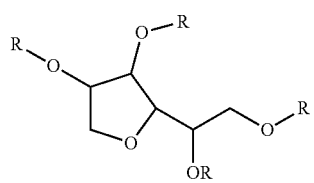
(Ia)

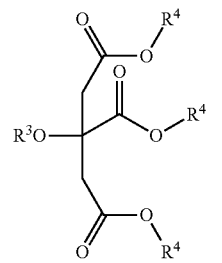
(Ib)

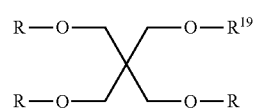
(Ic)

wherein each R is independently —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each n is independently 0 to 20; each m is independently 0 to 20; m+n is greater than 0; each R$^1$ is independently a linear or branched alkyl group having 5 to 29 carbons optionally comprising at least 1 unsaturated bond; each R$^2$ is independently —H, or a linear or branched alkyl group having 6 to 30 carbons optionally comprising at least 1 unsaturated bond; or a mixtures thereof, provided that when the compound is of Formula (Ia) then at least one of R or R$^2$ is —H; each R$^3$ is independently a —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each R$^4$ is independently —H, a linear or branched alkyl group having 6 to 30 carbons optionally comprising at least 1 unsaturated bond, or combinations thereof; —(CH$_2$CH$_2$O)$_{n'}$(CH(CH$_3$)CH$_2$O)$_{m'}$R$^2$; or —(CH$_2$CH$_2$O)$_{n'}$(CH(CH$_3$)CH$_2$O)$_{m'}$C(O)R$^1$; each n' is independently 0 to 20; each m' is independently 0 to 20; m'+n' is greater than 0; provided when the compound is Formula (Ib), then at least one R$^2$, R$^3$ or R$^4$ is —H; and each R$^{19}$ is —H, —C(O)R$^1$, or —CH$_2$C[CH$_2$OR]$_3$, provided when the compound is Formula (Ic), then at least one R$^{19}$ or R is —H.

The present invention further comprises a substrate treated with a composition comprising a wax and the above-described extender composition, which when applied to a substrate provides a surface effect.

The present invention further comprises a composition for treating a substrate comprising i) a wax and ii) a polymer extender composition comprising a compound prepared by: (i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic).

DETAILED DESCRIPTION OF THE INVENTION

Trademarks are indicated herein by capitalization.

The present invention comprises a method of treating a substrate comprising contacting the substrate with a composition comprising i) a wax and ii) a polymer extender composition comprising a compound prepared by: (i) reacting (a) at least one isocyanate group-containing compound selected from isocyanate, diisocyanate, polyisocyanate, or mixtures thereof, and (b) at least one isocyanate-reactive compound selected from formula (Ia), (Ib), or (Ic): wherein each R is independently —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$ $(CH(CH_3)CH_2O)_mC(O)R^1$; each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or a mixtures thereof, provided that when the compound is of Formula (Ia) then at least one of R or $R^2$ is —H; each $R^3$ is independently a —H; —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$; each $R^4$ is independently —H, a linear or branched alkyl group having 6 to 30 carbons optionally comprising at least 1 unsaturated bond, or combinations thereof; —$(CH_2CH_2O)_n(CH(CH_3)CH_2O)_mR^2$; or —$(CH_2CH_2O)_n(CH(CH_3)CH_2O)_mC(O)R^1$; each n' is independently 0 to 20; each m' is independently 0 to 20; m'+n' is greater than 0; provided when the compound is Formula (Ib), then at least one $R^2$, $R^3$ or $R^4$ is —H; and each $R^{19}$ is —H, —$C(O)R^1$, or —$CH_2C[CH_2OR]_3$, provided when the compound is Formula (Ic), then at least one $R^{19}$ or R is —H.

In particular, the extender composition is a non-fluorinated urethane useful for improving the performance of fluorinated polymers in imparting durable repellent properties to fibrous substrates. The fibrous substrates include fibers, textiles, paper, nonwovens, leather, carpets, fabrics, fabric blends or a combination thereof. By "fabrics" is meant natural or synthetic fabrics, or blends thereof, composed of fibers such as cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers.

Superior durable surface properties, along with desirable properties of low yellowing and good durability, are imparted to fibrous substrates by the addition of the inventive extender composition to surface treating agents before application to fibrous substrates. These combined blends are applied to the fibrous substrates in the form of a dispersion in water or other solvent either before, after or during the application of other treatment chemicals.

When so applied, the extender composition useful in this invention, in combination with a wax, has been found in particular to improve the durability of surface properties, especially oil- and water-repellency, in fibrous substrates after laundering by as much as 50%. The durability of the repellency is improved compared to other known extender compositions. Further, use of the extender composition of the present invention eliminates the need for fluorinated materials, which is desirable in the industry.

The aqueous dispersion blends produced by mixing the extender composition dispersion with a wax are applied to surfaces of fibrous substrates by known methods to impart oil-, soil- and water-repellency and other surface effects. A distinguishing feature of use of the treating agent-extender compositions of the present invention is high durability of the surface finish on the substrate.

The extender composition useful in the present invention comprises a compound prepared by:
(i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic):

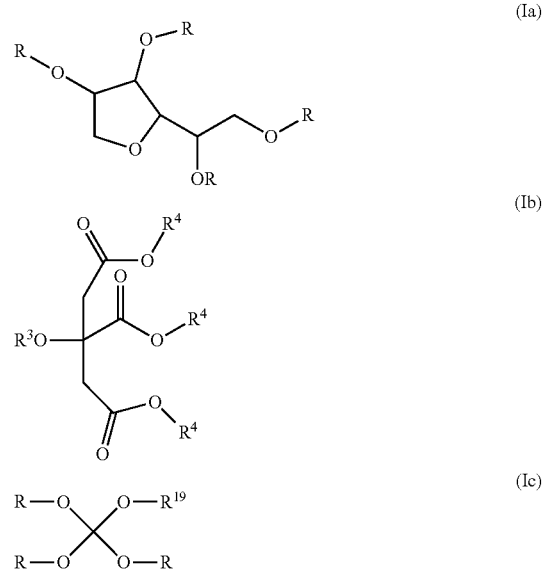

wherein each R is independently a —H; —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$; each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or a mixtures thereof, provided that when the compound is of Formula (Ia) then at least one of R or $R^2$ is —H; each $R^3$ is independently a —H; —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$; each $R^4$ is independently —H, a linear or branched alkyl group having 6 to 30 carbons optionally comprising at least 1 unsaturated bond, or combinations thereof; —$(CH_2CH_2O)_n(CH(CH_3)CH_2O)_mR^2$; or —$(CH_2CH_2O)_n(CH(CH_3)CH_2O)_mC(O)R^1$; each n' is independently 0 to 20; each m' is independently 0 to 20; m'+n' is greater than 0; provided when the compound is Formula (Ib), then at least one $R^2$, $R^3$ or $R^4$ is a —H; and each $R^{19}$ is —H, —$C(O)R^1$, or —$CH_2C[CH_2OR]_3$, provided when the compound is Formula (Ic), then at least one $R^{19}$ or R is —H.

For compounds of Formula (Ia), (Ib), or (Ic), the —$(CH_2CH_2O)$— represents oxyethylene groups (EO) and —$(CH(CH_3)CH_2O)$— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

In one embodiment, a polymer extender compound is prepared by: (i) reacting (a) at least one isocyanate group-containing isocyanate, diisocyanate, polyisocyanate, or mixture thereof, and compounds of Formula (Ia). In one embodiment, at least one R is —$C(O)R^1$ or $R^1$. Compounds of Formula (Ia) where at least one of R is —H and at least one R is selected from —$C(O)R^1$ are commonly known as alkyl sorbitans. These sorbitans can be mono-substituted, di-substituted, or tri-substituted with —$C(O)R^1$. It is known that commercially available sorbitans, such as SPAN, contain a mixture of the various sorbitans ranging from where each R is H (un-substituted), and sorbitans where each R is —C(O)R$^1$ (fully substituted); wherein R$^1$ is a linear or branched alkyl group having 5 to 29 carbons; and mixtures of various substitutions thereof. The commercially available sorbitans may also include amounts of sorbitol, isosorbide, or other intermediates or byproducts.

In one preferred embodiment, at least one R is —C(O)R$^1$, and R$^1$ is a linear branched alkyl group having 5 to 29 carbons, more preferably 7 to 21 carbons, and most preferably 11 to 21 carbons. Preferred compounds include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds include mono-, di-, and tri-substituted sorbitan stearates or sorbitan behenins.

Optionally, R$^1$ is a linear or branched alkyl group having 5 to 29 carbons comprising at least 1 unsaturated bond. Examples of compounds of Formula (Ia) wherein at least one R is selected from —C(O)R$^1$; and R$^1$ contains at least 1 unsaturated bond, include, but are not limited to, sorbitan trioleate (i.e., wherein R$^1$ is —C$_7$H$_{14}$CH=CHC$_8$H$_{17}$). Other examples include but are not limited to mono-, di-, and tri-substituted sorbitans derived from palmitoleic acid, lineolic acid, arachidonic acid, and erucic acid.

In one embodiment, a compound of Formula (Ia) is employed, wherein at least one R is independently —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$. Compounds of Formula (Ia), wherein at least one R is —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups R$^1$ or R$^2$. It is known that commercially available polysorbates, contain a mixture of the various polysorbates ranging from where each R$^2$ is H (unsubusited), and polysorbates where each R$^1$ is a linear or branched alkyl group having 5 to 29 carbons (fully substituted); and mixtures of various substitutions thereof. Examples of compounds of Formula (Ia) include polysorbates such as polysorbate tristearate, and polysorbate monostearate. Examples of compounds of Formula (Ia) wherein m+n is greater than 0, and wherein R$^1$ comprises at least 1 unsaturated bond, but not limited to, polysorbate trioleate (wherein R$^1$ is C$_7$H$_{14}$CH=CHC$_8$H$_{17}$) and are sold commercially under the name Polysorbate 80. Reagents may include mixtures of compounds having various values for R, R$^1$, and R$^2$, and may also include mixtures of compounds where R$^1$ comprises at least one unsaturated bond with compounds where R$^1$ is fully saturated.

In another embodiment, compounds of Formula (I b), known as alkyl citrates, are used. These citrates can be present as a mono-substituted, di-substituted, or tri-substituted with alkyl groups R$^1$ or R$^2$. It is known that commercially available citrates contain a mixture of the various citrates as well as citric acids from where R$^3$ and each R$^4$ is —H, ranging to citrates where each R$^4$ is a linear or branched alkyl group having 6 to 30 carbons optionally comprising at least 1 unsaturated bond; and mixtures of various substitutions thereof. Mixtures of citrates having various values for R$^1$, R$^2$, R$^3$, and R$^4$ may be used, and may also include mixtures of compounds where R$^1$ comprises at least one unsaturated bond with compounds where R$^1$ is fully saturated. Alkyl citrates are also commercially available wherein m'+n' is greater than 0, R$^4$ is —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$ and are present in the various substitutions from wherein R$^3$ and each R$^2$ is H to wherein each R$^1$ and/or R$^2$ is a linear or branched alkyl group having 5 to 30 carbons optionally comprising at least 1 unsaturated bond. Examples of compounds of Formula (Ib) include, but are not limited to, trialkyl citrates.

In another embodiment, compounds of Formula (Ic) are employed, known as pentaerythriol esters. These pentaerythriol esters can be present as a mono-substituted, di-substituted, or tri-substituted with alkyl groups R$^1$ or R$^2$. Preferred compounds of Formula (Ic) are dipentaerythriol esters, where R$^{19}$ is —CH$_2$C[CH$_2$OR]$_3$. It is known that commercially available pentaerythriol esters contain a mixture of the various pentaerythriol esters where R$^{19}$ and each R is —H, ranging to pentaerythriol esters where each R is —C(O)R$^1$, and R$^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R. The pentaerythriol esters also may contain compounds with mixtures of different chain lengths for R, or mixtures of compounds where R$^1$ comprises at least one unsaturated bond with compounds where R$^1$ is fully saturated.

Compounds of Formulas (Ia), (Ib), and (Ic) can all be bio-based derived. By "bio-based derived", it is meant that at least 10% of the material can be produced from non-crude oil sources, such as plants, other vegetation, and tallow. In one embodiment, the compounds of formulas (Ia), (Ib), and (Ic) are from about 10% to 100% bio-based. In one embodiment, the compounds of formulas (Ia), (Ib), and (Ic) are from about 35% to 100% bio-based. In one embodiment, the compounds of formulas (Ia), (Ib), and (Ic) are from about 50% to 100% bio-based. In one embodiment, the compounds of formulas (Ia), (Ib), and (Ic) are from about 75% to 100% bio-based. In one embodiment, the compounds of formulas (Ia), (Ib), and (Ic) are 100% bio-based. At least one R, R$^3$, R$^4$, R$^{19}$ of each of Formulas (Ia), (Ib), and (Ic) is —H to allow reactivity with isocyanate groups. The average OH value of the compounds can range from just greater than 0 to about 230, preferably about 10 to about 175, and most preferably from about 25 to about 140.

To make the polymer extender compounds of the present invention, a compound of formula (Ia), (Ib), or (Ic), or mixtures thereof, is reacted with an isocyanate group-containing isocyanate, diisocyanate, polyisocyanate, or mixture thereof. The isocyanate group-containing compound adds to the branched nature of the polymer. The term "polyisocyanate" is defined as di- and higher-functional isocyanates, and the term includes oligomers. Any monoisocyanate or polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers. Preferred is DESMODUR N-100 (a hexamethylene diisocyanate-based vailable from Bayer Corporation, Pittsburgh, Pa.). Other triisocyanates useful for the purposes of this invention are those obtained by reacting three moles of toluene diisocyanate. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Particularly preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas (IIa), (IIb), (IIc), (IId), and (IIe):

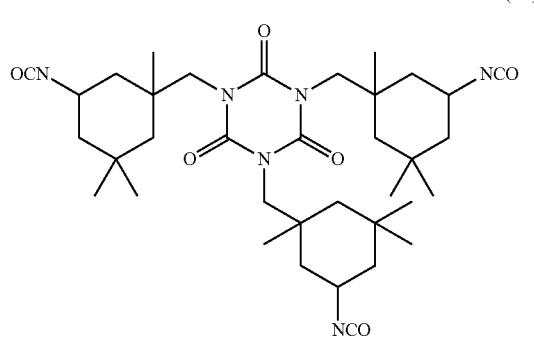

(IIa)

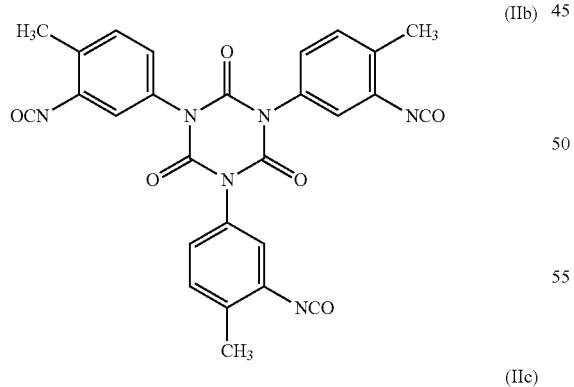

(IIb)

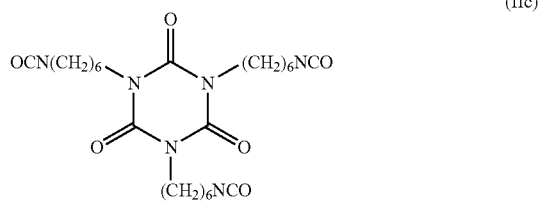

(IIc)

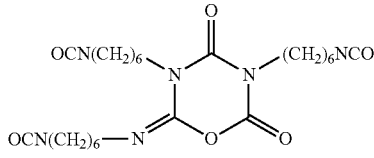

(IId)

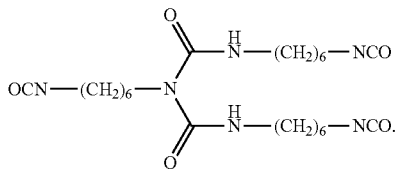

(IIe)

The diisocyanate trimers (IIa-e) are available, for instance as DESMODUR Z4470, DESMODUR IL, DESMODUR N-3300, and DESMODUR XP2410, and DESMODUR N100, respectively, from Bayer Corporation.

In one embodiment, the reaction product of (a) at least one isocyanate-containing compound with (b) an isocyanate-reactive compound contains unreacted isocyanate groups which are further reacted with (c) at least one second compound selected from water, organic compounds of Formula (IIIa)

$$R^5\text{—}X \quad \text{(IIIa)},$$

organic compounds of Formula (IIIb)

or mixtures thereof, wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy-functional linear or branched organosiloxane, a thiol-functional $C_1$ to $C_{30}$ linear or branched alkyl, an amine-functional $C_1$ to $C_{30}$ linear or branched alkyl,

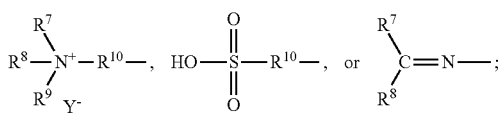

wherein $R^7$, $R^8$, and $R^9$ are each independently, —H, —$C_1$ to $C_6$ alkyl, or combinations thereof; $R^{10}$ is a divalent alkyl group of 1 to 20 carbons; X is an isocyanate-reactive functional group such as —OH, —C(O)OH, —SH, —NH($R^{12}$), —O—$(CH_2CH_2O)_s(CH(CH_3)CH_2O)_t$—H or —[C(O)]—O—$(CH_2CH_2O)_s(CH(CH_3)CH_2O)_t$—H; $R^{12}$ is —H or a monovalent $C_1$ to $C_6$ alkyl group; $R^{15}$, $R^{16}$, and $R^{17}$ are each independently a —H; —$R^{18}$; —$C(O)R^{18}$ provided that at least one $R^{15}$, $R^{16}$, or $R^{17}$ is a —H; $R^{18}$ is independently a linear or branched alkyl group having 5 to 29 carbons optionally comprising at least 1 unsaturated bond; z is 1 to 15; Y is —Cl; s is an integer of 0 to 50; t is an integer of 0 to 50; s+t is greater than 0. The term "branched", as used herein, means that the functional chain can be branched at any point, for example as a quarternary substituted carbon, and can contain any number of branched substitutions.

In one embodiment, the second compound is present and reacts with about 0.1 mol % to about 60 mol % of said isocyanate groups. Preferably the concentration of compounds of isocyanate-reactive compound (b) is greater than the concentration of second compound(s) (c).

In one embodiment, the second compound (c) of the polymer extender compound is water. Water may be used to crosslink unreacted isocyanate groups by urea linkage. In a further embodiment, the second compound (c) is of Formula (IIIa). The compound of formula (IIIa) can be a hydrophilic water-solvatable material comprising at least one hydroxy-terminated polyether of formula (IIIa) wherein isocyanate-reactive group X is —O—$(CH_2CH_2O)_s(CH(CH_3)CH_2O)_r$—H or —[C(O)]—O—$(CH_2CH_2O)_s(CH(CH_3)CH_2O)_r$—H. In this embodiment, —$(CH_2CH_2O)$— represents oxyethylene groups (EO) and —$(CH(CH_3)CH_2O)$— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. The hydroxy-terminal polyethers of Formula (IIIa) preferably have an average molecular weight equal to or greater than about 200, and most preferably between 350 and 2000.

In another embodiment, the second compound (c) is an organic compound of Formula (IIIa), where isocyanate-reactive group X is —OH, —C(O)OH, —SH, —NH($R^{12}$); and $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional $C_1$ to $C_{30}$ linear or branched alkyl.

Where isocyanate-reactive group X is —OH, examples of Formula (IIIa) include but are not limited to alkyl alcohols such as propanol, butanol, or fatty alcohols including stearyl alcohol ($R^5$ is a —$C_1$ to $C_{30}$ linear or branched alkyl optionally comprising at least one unsaturated group); alkyl diols or polyols such as ethanediol, propanediol, butanediol, or hexanediol ($R^5$ is a hydroxy-functional $C_1$ to $C_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units ($R^5$ is a hydroxy-functional linear or branched $C_1$ to $C_{30}$ polyether); polyester polyols ($R^5$ is a hydroxy-functional linear or branched polyester); silicone prepolymer polyols ($R^5$ is a hydroxy-functional linear or branched organosiloxane); N,N-dimethylaminoethanol ($R^5$ is an amine-functional $C_1$ to $C_{30}$ linear or branched alkyl); choline chloride or betaine HCl ($R^5$ is $Y^-(R^7)(R^8)(R^9)N+R^{10}$—); butanone oxime ($R^5$ is $(R^7)(R^8)C=N$—). The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). Preferably, the polyether glycols have an average molecular weight equal to or greater than about 200, and most preferably between 350 and 2000.

Where isocyanate-reactive group X is —C(O)OH, examples of Formula (IIIa) include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid ($R^5$ is a —$C_1$ to $C_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid ($R^5$ is a hydroxy-functional $C_1$ to $C_{30}$ linear or branched alkyl); and mercaptoalkanoic acids such as mercaptopropionic acid ($R^5$ is a thiol-functional $C_1$ to $C_{30}$ linear or branched alkyl).

Where isocyanate-reactive group X is —SH, specific examples of Formula (IIIa) include but are not limited to alkyl thiols such as lauryl mercaptan or dodecyl mercaptan ($R^5$ is a —$C_1$ to $C_{30}$ linear or branched alkyl optionally comprising at least one unsaturated group). Where isocyanate-reactive group X is —NH($R^{12}$), specific examples of Formula (IIIa) include but are not limited to alkyl amines such as diisopropylamine, propylamine, hexylmine, or laurylamine ($R^5$ is a —$C_1$ to $C_{30}$ linear or branched alkyl optionally comprising at least one unsaturated group); alkanolamines such as ethanolamine or propanolamine ($R^5$ is a hydroxy-functional $C_1$ to $C_{30}$ linear or branched alkyl); silicone prepolymer polyamines ($R^5$ is a amine-functional linear or branched organosiloxane); alkyl diamines ($R^5$ is an amine-functional $C_1$ to $C_{30}$ linear or branched alkyl); and aminoalkanesulfonic acids such as 2-aminoethanesulfonic acid ($R^5$ is HO—$S(O)_2R^{10}$—).

In a further embodiment, the second compound (c) of the extender polymer is of formula (IIIb). These compounds are commonly referred to as polyglycerols. These polyglycerols can be present where $R^{15}$, $R^{16}$, and $R^{17}$ are each independently a —H; —$R^{18}$; —$C(O)R^{18}$ provided that at least one $R^{15}$, $R^{16}$, or $R^{17}$ is a —H; and wherein $R^{18}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono(carpylate/caprate), decaglyceryl di(carpylate/caprate), decaglycerol, polyglycerol-3, and $C_{18}$ diglyceride.

In one embodiment, the reaction product of (a) an isocyanate-containing compound with (b) an isocyanate-reactive compound contains unreacted isocyanate groups which are further reacted with multiple second compounds (c) comprising both compounds of formula (IIIa) or (IIIb) and water. Water is used to cross-link unreacted isocyanates to creates urea linkages. In one aspect, the final compound contains 0% to about 1% of reactive isocyanate groups. In one embodiment, the molecular weight of the polymer extender compound is at least 10,000 g/mol. In one embodiment, 30 to 100% by mol of the total urethane linkages in the compound are from the reaction product of component (a) and component (b). When optimum durable water repellency is desired, 80 to 100% by mol of the total urethane linkages in the compound are from the reaction product of component (a) and component (b). In another embodiment, 90 to 100% by mol of the total urethane linkages in the compound are from the reaction of component (a) and component (b). In a third embodiment, 95 to 100% by mol of the total urethane linkages in the compound are from the reaction of component (a) and component (b).

When optimum stain release is desired, the compound selected from Formula (IIIa), (IIIb), or water reacts with about 0.1 mol % to about 70 mol % of reactive isocyanate groups, and the substituted sugar alcohols react with about 30 mol % to about 99.9 mol % of reactive isocyanate groups. In another embodiment, the compound selected from Formula (IIIa), (IIIb), or water reacts with about 40 mol % to about 70 mol % of reactive isocyanate groups, and the substituted sugar alcohols react with about 30 mol % to about 60 mol % of reactive isocyanate groups.

The polymer extender compounds of the present invention can be made in one step. The polymer extender compounds of the present invention comprising more than one organic compound of Formula (Ia), (Ib), or (Ic) and/or one or more second compounds (c) can be also made in one step. Preferably, if more than one organic compounds of Formula (Ia), (Ib), or (Ic) and/or on or more second compounds (c) are used, then the synthesis can be completed sequentially. A sequential addition is especially useful when employing compounds of Formula (Ia), (Ib), or (Ic) with high OH numbers, or when using polyfunctional compounds (c). These steps comprise reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic) wherein each R is independently a —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or a mixtures thereof, provided that when the compound is of Formula (Ia) then at least one of R or $R^2$ is —H; each $R^3$ is independently a —H; —$R^1$; —C(O)$R^1$; —(CH$_2$CH$_2$O)$_n$(CH(CH$_3$)CH$_2$O)$_m$$R^2$; or —(CH$_2$CH$_2$O)$_{n'}$(CH(CH$_3$)CH$_2$O)$_m$C(O)$R^1$; each $R^4$ is independently —H, a linear or branched alkyl group having 6 to 30 carbons optionally comprising at least 1 unsaturated bond, or combinations thereof; —(CH$_2$CH$_2$O)$_{n'}$(CH(CH$_3$)CH$_2$O)$_m$$R^2$; or —(CH$_2$CH$_2$O)$_{n'}$(CH(CH$_3$)CH$_2$O)$_m$C(O)$R^1$; each n' is independently 0 to 20; each m' is independently 0 to 20; m'+n' is greater than 0; provided when the compound is Formula (Ib), then at least one $R^2$, $R^3$ or $R^4$ is a —H; and each $R^{19}$ is —H, —C(O)$R^1$, or —CH$_2$C[CH$_2$OR]$_3$, provided when the compound is Formula (Ic), then at least one $R^{19}$ or R is —H. When a second compound (c) is used, molar concentrations of the at least one compound selected from Formula (Ia), (Ib), or (Ic) are such that there remains unreacted isocyanate groups to react with the one or more second compound(s) (c).

The at least one isocyanate, diisocyanate, polyisocyanate, or mixture thereof, and at least one isocyanate group-containing compound selected from isocyanate, diisocyanate, polyisocyanate, or mixture thereof, and (b) at least one isocyanate-reactive compound selected from formula (Ia), (Ib), or (Ic), or mixture thereof, are reacted. This reaction is typically conducted by charging a reaction vessel with the isocyanate, diisocyanate, or polyisocyanate, and at least one compound selected from formula (Ia), (Ib), or (Ic), or mixture thereof, and optionally a second compound (c). The order of reagent addition is not critical, but if water is used, the water should be added after the isocyanates and at least one compound selected from formula (Ia), (Ib), or (Ic), or mixture thereof are reacted.

The specific weight of the reactants charged is based on their equivalent weights and on the working capacity of the reaction vessel, and is adjusted so that compound selected from formula (Ia), (Ib), or (Ic) will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound (c) are added, and the mixture is allowed to react for several more hours or until all of the isocyanate has been reacted.

The extender compositions as described above are then blended with any of a variety of known waxes, preferably in a weight ratio of extender compound:wax from about 1:10 to about 10:1, more preferably a ratio of from about 1:8 to about 8:1, and most preferably in a ratio of from about 2:8 to about 8:2. The melting points are greater than about 30° C., preferably about 30-70° C., and more preferably about 40-55° C. Examples include animal waxes, plant and vegetable waxes, mineral waxes, petroleum waxes, and synthetic waxes, including silicone waxes. More specifically, the wax is selected from beeswax; microcrystalline wax; oxidized microcrystalline wax; paraffin wax; montan wax; ozokerite wax; carnauba wax; candililla wax; palm wax; whale wax; lanolin; sugar cane wax; sugar esters; polyolefin wax; mono-, di, or tri-glyceride esters; fatty acid ester waxes; or blends thereof. In another embodiment, the wax is selected from silicone wax, a blend of silicone waxes, or a blend of silicone wax with at least one non-silicone wax.

Of particular interest are mono-, di-, or tri-glyceride ester waxes typically found in the food and cosmetics industries. Such compounds can be biological unmodified alkyl esters but also include mono- or di-glycerides modified with reactive compounds including fatty acids or acetic acid. Typically, these compounds are mixtures of compounds containing mono-substituted, di-substituted, and tri-substituted esters of a distribution of chain lengths. Similarly, other polyfunctional alcohols may be esterified with fatty acids to make suitable, functional waxes. Particularly preferred ester compounds include but are not limited to beeswax, candililla wax, carnauba wax, surgarcane wax, palm wax, tribehenin, fatty acid triglycerides, fatty acid glycol esters, acetic esters of monoglycerides, and blends thereof. Such ester compounds are available from Croda, East Yorkshire, England; or DuPont Nutrition & Health, Copenahgen, Denmark.

A variety of silicone waxes may be employed in the invention, including but not limited to alkyl silicones, alkyl aryl silicones, and blends thereof. Particularly preferred are alkylated alkylated silicones based on alkyl pendant groups, including those compounds of Formula (IV).

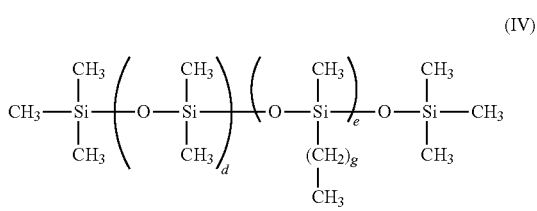

(IV)

Such compounds range from liquids to soft pastes to hard waxes, and the physical properties can be tailored by varying the molecular weight, alkyl chain lengths, and long alkyl chain content. Preferably, g is 2 to 40, more preferably 10 to 32, and most preferably 18 to 32. Variables d and e are independently 2 to 20, preferably 2 to 10, and most preferably 2 to 6. The ratio of silicone to alkyls and the chain length of the alkyls determine the melting point and liquidity of the final product. Examples of suitable compounds include DOW CORNING waxes available from Dow Corning, Midland, Mich.; WACKER silicone waxes available from, Wacker, Munchen, Germany; silicone waxes available from Momentive Specialty Chemicals, Inc., Columbus, Ohio; and SILWAX, available from Siltech, Toronto, Canada.

The blended composition comprising a wax and the extender compounds of the present invention, applied to the fibrous substrate, optionally further comprises a blocked isocyanate to promote durability. This blocked isocyanate is added after copolymerization (i.e., as a blended isocyanate). An example of a suitable blocked isocyanate is PHOBOL XAN available from Huntsman Corp, Salt Lake City, Utah Other commercially available blocked isocyanates are also suitable for use herein. The desirability of adding a blocked isocyanate depends on the particular application for the copolymer. For most of the presently envisioned applications, the blocked isocyanate does not need to be present to achieve satisfactory cross-linking between chains or bonding to the fibers. When added as a blended isocyanate, amounts up to about 20% by weight are added.

The blended composition of the present invention, comprising a wax and the extender compound, optionally further comprises additional components including additional treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate. Other additives commonly used with such treating agents or finishes may also be present such as surfactants, pH adjusters, cross linkers, wetting agents, and other additives known by those skilled in the art. Preferably, the entire composition is non-fluorinated. Further, other extender compositions are optionally included to obtain a combination of benefits.

For example, when synthetic fabrics are treated, a wetting agent can be used, such as ALKANOL 6112 available from E. I. du Pont de Nemours and Company, Wilmington, Del. As a further example, when cotton or cotton-blended fabrics are treated, a wrinkle-resistant resin can be used such as PERMAFRESH EFC available from Emerald Carolina, LLC, Cahrlotte, N.C. As a further example, when nonwoven fabrics are treated, a wax extender can be employed such as FREEPEL 1225WR, available from Omnova Solutions Chester, S.C. An antistat such as ZELEC KC, available from Stepan, Northfield, Ill., or a wetting agent, such as hexanol, also are suitable. The dispersions are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

The present invention further comprises substrates treated with the above-described composition comprising i) a wax and ii) the extender compounds as described above. The composition also can contain optional agents to provide additional surface effects as described above, optional additives commonly used in treating substrates as described above, optional blocked isocyanate as described above, and optional additional distinct extender compositions. As previously noted, such substrates include paper, nonwovens, leather, fibers, textiles, fabrics, fabric blends, or combinations thereof. "Fabrics" includes natural or synthetic fabrics composed of fibers of cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers. Preferably, the substrate has been treated with a composition comprising an extender composition of the present invention and a fluorinated polymer such as a polyurethane or poly (meth)acrylate.

TEST METHODS

All solvents and reagents, unless otherwise indicated, were purchased from Sigma-Aldrich, St. Louis, Mo., and used directly as supplied. The paraffin waxes were obtained from Sigma-Aldrich, St. Louis, Mo. Sorbitan tristearate was obtained from Croda, East Yorkshire, England and DuPont Nutrition & Health, Copenhagen, Denmark. DESMODUR N-100 was obtained from Bayer Corporation, Pittsburgh, Pa. ARMEEN DM-18D was obtained from Akzo-Nobel, Bridgewater, N.J. PHOBOL XAN was obtained from Huntsman Corp, Salt Lake City, Utah.

Cetyl/Hexacosyl dimethicone and alkyl dimethicones were obtained from Siltech Corporation, Toronto, Canada.

Tribehenin, C18-C26 acid triglyceride wax, and C18-C36 acid glycol ester wax were obtained from Croda, East Yorkshire, England.

The acetic ester of monoglycerides made from edible fully hydrogenated palm oil/beeswax blend was obtained from DuPont Nutrition & Health, Copenhagen, Denmark.

Stearyl dimethicone/Octadecene blend was obtained from Dow Corning, Midland, Mich.

Cetearyl methicone and C-30 to C-45 Alkyl dimethicone were obtained from Momentive Performance Materials, Waterford, N.Y.

CHEMIDEX S was obtained form Lubrizol, Wickliffe, Ohio.

ETHAL LA-4 was obtained from Ethox Chemicals, Greenville, S.C.

The following tests were employed in evaluating the examples herein.

Test Method 1—Fabric Treatment

The fabrics treated in this study were 100% by weight khaki cotton twill available from SDL Atlas Textile Testing Solutions, Rock Hill, S.C. 29732 and 100% by weight red polyester fabric available from L. Michael OY, Finland. The fabric was treated with the aqueous dispersions of various compositions using a conventional pad bath (dipping) process. The prepared concentrated dispersions were diluted with deionized water to achieve a pad bath having 30 g/L of the treating agent dispersion in the bath.

For the treatment of the cotton fabric, a wetting agent, INVADINE PBN and a catalyzed cross-linking agent, KNITTEX 7636 (all available from Huntsman, Salt Lake City, Utah) were also included in the bath at 5 g/L and 30 g/L, respectively. The fabric was padded in the bath, and the excess liquid was removed by squeeze rollers. The wet pickup was around 95% on the cotton substrate. The "wet pick up" is the weight of the bath solution of the emulsion polymer and additives applied to the fabric, based on the dry weight of the fabric. The fabric was cured at approximately 165° C. for 3 minutes and allowed to "rest" after treatment and cure for at least 2 hours.

For the treatment of the polyester fabric, a wetting agent, INVADINE PBN (available from Huntsman, Charlotte, N.C., USA) and 60% acetic acid were also included in the bath at 5 g/L and 1 g/L, respectively. The fabric was padded in the bath, and the excess liquid removed by squeeze rollers. The wet pickup was around 55% on the polyester substrate. The "wet pick up" is the weight of the bath solution of the emulsion polymer and additives applied to the fabric, based on the dry weight of the fabric. The fabric was cured at approximately 160° C. for 2 minutes and allowed to "rest" after treatment and cure for about 15 to about 18 hours.

Test Method 2—Water Drop Repellency

The water repellency of a treated textile substrate was measured according to AATCC standard Test Method No. 193 and the method outlined in the *Teflon® Global Specifications and Quality Control Tests* booklet.

Test Method 3—Water Spray Repellency

Water repellency was further tested by utilizing the spray test method which is a measure of dynamic water repellency. The treated fabric samples were tested for water repellency according to AATCC standard Test Method No. 22 and the method outlined in the *Teflon® Global Specifications and Quality Control Tests* booklet.

Test Method 4—Bundesmann Absorbency

The treated fabric samples were tested for dynamic water absorbency before and after 30 home washes following ISO 9865 standard Test Method.

Test Method 5—Wash Durability

The fabric samples were laundered according to International Standard specified domestic washing procedure for textile testing. Fabric samples were loaded into a horizontal drum, front-loading type (Type A, WASCATOR FOM 71 MP-Lab) of automatic washing machine with a ballast load to give a total dry load of 4 lb. A commercial detergent was added (AATCC 1993 standard Reference Detergent WOB) and the washer program ISO 6330:2001-7A was used. After washing was complete, the entire load was placed into a KENMORE automatic dryer and dried on high for 45-50 min.

EXAMPLES

Preparation of Urethane Extender 1

In a 4-neck round bottom flask equipped with an overhead stirrer, thermocouple, dean-stark/condenser was added sorbitan tristearate (116.0 g; Hydroxy Number=77.2 mgKOH/g) and 4-methyl-2-pentanone (MIBK, 150 g). The solution was refluxed for 1 hour to remove any residual moisture. After the hour, the solution was cooled to 50° C. and DESMODUR N-100 (30 g) was added followed by a catalyst and the solution was heated to 80° C. for one hour. Water (1.71 g) was added to the reaction mixture, and the reaction mixture was heated at 80° C. for an additional four hours.

An aqueous dispersion of the compound was then prepared. Water (300 g), ARMEEN DM-18D (5.6 g), TERGITOL TMN-10 (2.8 g), and acetic acid (3.4 g) were added to a beaker and stirred to form a surfactant solution. The solution was heated to 60° C. The sorbitan urethane/MIBK solution was cooled to 60° C., and the surfactant solution was added slowly to produce a milky emulsion. The mixture was homogenized at 6000 psi, and the resulting emulsion was distilled under reduced pressure to remove the solvent, yielding a non-flammable urethane dispersion at 25% solids.

Comparative Example 1

The Urethane Extender 1 dispersion was evaluated according to the Performance Testing method below.

TABLE 1

Performance Data of 100% Extender Controls

| | Example C1 |
|---|---|
| Extender Composition | Urethane |
| Cotton Fabric | |
| Water Drop (0 HW/30 HW) | 3/4 |
| Water Spray (0 HW/30 HW) | 100/90 |
| Bundesmann-(0 HW/30 HW) | 48.01/37.45 |
| Polyester Fabric | |
| Water Drop (0 HW/30 HW) | 3/4 |
| Water Spray (0 HW/30 HW) | 100/100 |
| Bundesmann-(0 HW/30 HW) | 18.20/9.38 |

Comparative Examples C2 to C17

A 4-neck 500 mL round bottom flask was set up with an addition funnel, thermocouple, mechanical stirrer, nitrogen inlet, condenser, and gas outlet. The flask was charged with wax (30 g) and toluene (75 g) and heated to 80° C. In a separate flask, hot DI water (280.5 g), ARMEEN DM-18D (1.04 g), acetic acid (0.78 g), TERGITOL TMN-10 (1.04 g) and dipropylene glycol (7.32 g) were mixed and added to the flask with wax. The mixture was stirred for 30 minutes at 70° C. and then homogenized 4 passes at 6000 psi. Toluene was removed via distillation. The final product was filtered through a sock filter and diluted to 10% solids.

Examples 1 to 32

Urethane Extender 1 dispersions were blended with wax compositions of various compositions and melting point (Tm) according to the weight ratios listed in Tables 2-17. Ratios are based on a weight percent of solids content. Ingredients were added to a glass bottle and agitated for 5 minutes to ensure sufficient mixing.

Performance Testing

The controls or blend formulation compositions were applied to fabrics according to Test Method 1. Padding compositions contained 30 g/L of the solids content of control dispersion (Comparative Examples 1 to 17) or blend formulation of Examples 1 to 32.

The treated fabric samples were then tested according to Test Methods 2 to 4 after 0 home washes (0 HW) and 30 home washes (30 HW). Home washes were performed according to Test Method 5.

TABLE 2

Cetyl/Hexacosyl Dimethicone Wax ($T_m$ = 37° C.)

| | Example | | |
|---|---|---|---|
| | C2 | 1 | 2 |
| Wt. % Ratio of Extender to Wax | 0:100 | 20:80 | 80:20 |
| Cotton Fabric | | | |
| Water Drop (0 HW/30 HW) | 0/0 | 2/2 | 3/4 |
| Water Spray (0 HW/30 HW) | 0/0 | 70/75 | 100/100 |
| Bundesmann (0 HW/30 HW) | — | 93.15/97.17 | 32.51/32.60 |
| Polyester Fabric | | | |
| Water Drop (0 HW/30 HW) | 0/1 | 2/3 | 3/4 |
| Water Spray (0 HW/30 HW) | 25/50 | 60/85 | 80/100 |
| Bundesmann (0 HW/30 HW) | — | 46.25/28.41 | 22.81/14.78 |

TABLE 3

Cetyl/Hexacosyl Dimethicone Wax ($T_m$ = 35° C.)

| | Example | | |
|---|---|---|---|
| | C3 | 3 | 4 |
| Wt. % Ratio of Extender to Wax | 0:100 | 20:80 | 80:20 |
| Cotton Fabric | | | |
| Water Drop (0 HW/30 HW) | 0/0 | 3/4 | 3/4 |
| Water Spray (0 HW/30 HW) | 0/0 | 85/70 | 100/100 |
| Bundesmann (0 HW/30 HW) | — | 62.26/71.28 | 22.96/38.78 |
| Polyester Fabric | | | |
| Water Drop (0 HW/30 HW) | 0/2 | 2/3 | 3/4 |
| Water Spray (0 HW/30 HW) | 50/50 | 80/85 | 80/75 |
| Bundesmann (0 HW/30 HW) | — | 38.09/21.85 | 24.88/24.32 |

TABLE 4

Beeswax ($T_m$ = 61-65° C.)

| | Example | | |
|---|---|---|---|
| | C4 | 5 | 6 |
| Wt. % Ratio of Extender to Wax | 0:100 | 20:80 | 80:20 |
| Cotton Fabric | | | |
| Water Drop (0 HW/30 HW) | 2/0 | 3/4 | 3/4 |
| Water Spray (0 HW/30 HW) | 60/0 | 75/85 | 100/90 |
| Bundesmann (0 HW/30 HW) | — | 62.16/60.72 | 48.96/17 |
| Polyester Fabric | | | |
| Water Drop (0 HW/30 HW) | 0/2 | 2/4 | 3/3 |
| Water Spray (0 HW/30 HW) | 50/50 | 50/90 | 85/90 |
| Bundesmann (0 HW/30 HW) | — | 47.27/18.49 | 23.72/15.13 |

TABLE 5

Tribehenin Wax ($T_m$ = 57-62° C.)

| | Example | | |
|---|---|---|---|
| | C5 | 7 | 8 |
| Wt. % Ratio of Extender to Wax | 0:100 | 20:80 | 80:20 |
| Cotton Fabric | | | |
| Water Drop (0 HW/30 HW) | 3/0.5 | 3/3 | 3/4 |
| Water Spray (0 HW/30 HW) | 60/60 | 90/90 | 90/100 |
| Bundesmann (0 HW/30 HW) | — | 67.07/66.49 | 48.53/37.97 |
| Polyester Fabric | | | |
| Water Drop (0 HW/30 HW) | 1/2 | 2/4 | 3/4 |
| Water Spray (0 HW/30 HW) | 50/60 | 85/85 | 90/100 |
| Bundesmann (0 HW/30 HW) | — | 41.51/19.27 | 20.50/12.38 |

TABLE 6

Acetic ester of monoglycerides made from edible fully hydrogentated palm based oil blended with beeswax

| | Example | | |
|---|---|---|---|
| | C6 | 9 | 10 |
| Wt. % Ratio of Extender to Wax | 0:100 | 20:80 | 80:20 |
| Cotton Fabric | | | |
| Water Drop (0 HW/30 HW) | 0/0 | 0/0 | 3/4 |
| Water Spray (0 HW/30 HW) | 0/0 | 50/50 | 80/70 |
| Bundesmann (0 HW/30 HW) | — | 99.59/104.38 | 78.39/64.3 |
| Polyester Fabric | | | |
| Water Drop (0 HW/30 HW) | 0/0 | 1/3 | 4/4 |
| Water Spray (0 HW/30 HW) | 0/25 | 50/85 | 70/85 |
| Bundesmann (0 HW/30 HW) | — | 50.53/27.77 | 28.63/18.23 |

TABLE 7

C18-C36 Acid Triglyceride Wax ($T_m$ = 70-75° C.)

| | Example | | |
|---|---|---|---|
| | C7 | 11 | 12 |
| Wt. % Ratio of Extender to Wax | 0:100 | 20:80 | 80:20 |
| *Cotton Fabric* | | | |
| Water Drop (0 HW/30 HW) | 2/0.5 | 2/3 | 3/4 |
| Water Spray (0 HW/30 HW) | 50/50 | 65/80 | 100/100 |
| Bundesmann (0 HW/30 HW) | — | 76.96/68.20 | 46.62/37.72 |
| *Polyester Fabric* | | | |
| Water Drop (0 HW/30 HW) | 1/2 | 2/4 | 3/4 |
| Water Spray (0 HW/30 HW) | 50/50 | 85/85 | 100/100 |
| Bundesmann (0 HW/30 HW) | — | 45.58/22.66 | 20.73/11.12 |

TABLE 8

C18-C36 Acid Glycol Ester Wax ($T_m$ = 70-75° C.)

| | Example | | |
|---|---|---|---|
| | C8 | 13 | 14 |
| Wt. % Ratio of Extender to Wax | 0:100 | 20:80 | 80:20 |
| *Cotton Fabric* | | | |
| Water Drop (0 HW/30 HW) | 0/0 | 1/2 | 3/4 |
| Water Spray (0 HW/30 HW) | 25/0 | 50/50 | 90/100 |
| Bundesmann (0 HW/30 HW) | — | 98.76/96.48 | 51.56/41.19 |
| *Polyester Fabric* | | | |
| Water Drop (0 HW/30 HW) | 0/1 | 2/3 | 3/4 |
| Water Spray (0 HW/30 HW) | 50/50 | 50/85 | 90/90 |
| Bundesmann (0 HW/30 HW) | — | 51.30/24.13 | 25.63/15.70 |

TABLE 9

C-22 Alkyl Dimethicone Wax ($T_m$ = 37° C.)

| | Example | | |
|---|---|---|---|
| | C9 | 15 | 16 |
| Wt. % Ratio of Extender to Wax | 0:100 | 20:80 | 80:20 |
| *Cotton Fabric* | | | |
| Water Drop (0 HW/30 HW) | 1/0 | 4/4 | 3/4 |
| Water Spray (0 HW/30 HW) | 60/25 | 100/85 | 100/100 |
| Bundesmann (0 HW/30 HW) | — | 35.60/45.69 | 17.45/42.18 |
| *Polyester Fabric* | | | |
| Water Drop (0 HW/30 HW) | 0/2 | 3/4 | 4/4 |
| Water Spray (0 HW/30 HW) | 50/50 | 85/95 | 90/100 |
| Bundesmann (0 HW/30 HW) | — | 23.55/15.32 | 15.80/16.37 |

TABLE 10

C-22 Alkyl Dimethicone Wax ($T_m$ = 27-31° C.)

| | Example | | |
|---|---|---|---|
| | C10 | 17 | 18 |
| Wt. % Ratio of Extender to Wax | 0:100 | 20:80 | 80:20 |
| *Cotton Fabric* | | | |
| Water Drop (0 HW/30 HW) | 2/0.5 | 4/4 | 3/4 |
| Water Spray (0 HW/30 HW) | 70/50 | 90/85 | 100/100 |
| Bundesmann (0 HW/30 HW) | — | 53.37/48.82 | 20.97/33.01 |
| *Polyester Fabric* | | | |
| Water Drop (0 HW/30 HW) | 2/2 | 2/4 | 3/4 |
| Water Spray (0 HW/30 HW) | 70/60 | 95/95 | 100/100 |
| Bundesmann (0 HW/30 HW) | — | 25.37/16.99 | 11.31/14.36 |

TABLE 11

C-26 Alkyl Dimethicone Wax ($T_m$ = 65° C.)

| | Example | | |
|---|---|---|---|
| | C11 | 19 | 20 |
| Wt. % Ratio of Extender to Wax | 0:100 | 20:80 | 80:20 |
| *Cotton Fabric* | | | |
| Water Drop (0 HW/30 HW) | 3/0.5 | 4/4 | 3/4 |
| Water Spray (0 HW/30 HW) | 80/60 | 75/85 | 100/90 |
| Bundesmann (0 HW/30 HW) | — | 60.78/57.63 | 42.77/40.84 |
| *Polyester Fabric* | | | |
| Water Drop (0 HW/30 HW) | 1/2 | 2/4 | 3/4 |
| Water Spray (0 HW/30 HW) | 50/60 | 85/85 | 80/90 |
| Bundesmann (0 HW/30 HW) | — | 36.47/22.99 | 20.72/13.95 |

TABLE 12

C-26 Alkyl Dimethicone Wax ($T_m$ = 54° C.)

| | Example | | |
|---|---|---|---|
| | C12 | 21 | 22 |
| Wt. % Ratio of Extender to Wax | 0:100 | 20:80 | 80:20 |
| *Cotton Fabric* | | | |
| Water Drop (0 HW/30 HW) | 3/0.5 | 4/4 | 3/4 |
| Water Spray (0 HW/30 HW) | 60/50 | 100/90 | 100/100 |
| Bundesmann (0 HW/30 HW) | — | 40.74/46.69 | 27.11/38.40 |
| *Polyester Fabric* | | | |
| Water Drop (0 HW/30 HW) | 2/2 | 3/4 | 3/4 |
| Water Spray (0 HW/30 HW) | 50/60 | 90/95 | 100/100 |
| Bundesmann (0 HW/30 HW) | — | 30.73/17.47 | 13.17/10.92 |

TABLE 13

C-26 Alkyl Dimethicone Wax ($T_m$ = 51° C.)

| | Example | | |
|---|---|---|---|
| | C13 | 23 | 24 |
| Wt. % Ratio of Extender to Wax | 0:100 | 20:80 | 80:20 |
| *Cotton Fabric* | | | |
| Water Drop (0 HW/30 HW) | 3/2 | 4/4 | 3/4 |
| Water Spray (0 HW/30 HW) | 70/60 | 100/85 | 100/90 |
| Bundesmann (0 HW/30 HW) | — | 88.11/50.70 | 16.72/43.05 |
| *Polyester Fabric* | | | |
| Water Drop (0 HW/30 HW) | 2/3 | 3/4 | 4/4 |
| Water Spray (0 HW/30 HW) | 60/70 | 80/90 | 100/100 |
| Bundesmann (0 HW/30 HW) | — | 29.10/17.51 | 15.09/21.12 |

TABLE 14

C-26 Alkyl Dimethicone Wax ($T_m$ = 43° C.)

| | Example | | |
|---|---|---|---|
| | C14 | 25 | 26 |
| Wt. % Ratio of Extender to Wax | 0:100 | 20:80 | 80:20 |
| Cotton Fabric | | | |
| Water Drop (0 HW/30 HW) | 0/0 | 3/4 | 3/4 |
| Water Spray (0 HW/30 HW) | 0/0 | 80/75 | 100/90 |
| Bundesmann (0 HW/30 HW) | — | 69.99/64.73 | 31.08/36.19 |
| Polyester Fabric | | | |
| Water Drop (0 HW/30 HW) | 1/2 | 3/4 | 3/3 |
| Water Spray (0 HW/30 HW) | 60/60 | 85/90 | 100/85 |
| Bundesmann (0 HW/30 HW) | — | 31.51/21.49 | 20.40/13.93 |

TABLE 15

C-32 Alkyl dimethicone Wax ($T_m$ = 66-67° C.)

| | Example | | |
|---|---|---|---|
| | C15 | 27 | 28 |
| Wt. % Ratio of Extender to Wax | 0:100 | 20:80 | 80:20 |
| Cotton Fabric | | | |
| Water Drop (0 HW/30 HW) | 3/1 | 3/4 | 3/4 |
| Water Spray (0 HW/30 HW) | 90/60 | 100/95 | 100/90 |
| Bundesmann (0 HW/30 HW) | — | 45.45/57.52 | 29.71/35.98 |
| Polyester Fabric | | | |
| Water Drop (0 HW/30 HW) | 1/2 | 3/4 | 4/4 |
| Water Spray (0 HW/30 HW) | 60/70 | 80/95 | 90/100 |
| Bundesmann (0 HW/30 HW) | — | 29.16/15.54 | 17.87/13.68 |

TABLE 16

C-32 Alkyl Dimethicone Wax ($T_m$ = 60° C.)

| | Example | | |
|---|---|---|---|
| | C16 | 29 | 30 |
| Wt. % Ratio of Extender to Wax | 0:100 | 20:80 | 80:20 |
| Cotton Fabric | | | |
| Water Drop (0 HW/30 HW) | 3/0.5 | 4/4 | 3/4 |
| Water Spray (0 HW/30 HW) | 85/60 | 95/90 | 100/90 |
| Bundesmann (0 HW/30 HW) | — | 49.89/62.72 | 27.97/33.24 |
| Polyester Fabric | | | |
| Water Drop (0 HW/30 HW) | 2/3 | 3/4 | 3/4 |
| Water Spray (0 HW/30 HW) | 50/70 | 90/90 | 100/100 |
| Bundesmann (0 HW/30 HW) | — | 28.91/21.74 | 12/14.07 |

TABLE 17

Stearyl Dimethicone Wax (and) Octadecene ($T_m$ = 40° C.)

| | Example | | |
|---|---|---|---|
| | C17 | 31 | 32 |
| Wt. % Ratio of Extender to Wax | 0:100 | 20:80 | 80:20 |
| Cotton Fabric | | | |
| Water Drop (0 HW/30 HW) | 3/0.5 | 4/4 | 3/4 |
| Water Spray (0 HW/30 HW) | 60/60 | 100/90 | 100/90 |
| Bundesmann (0 HW/30 HW) | — | 32.79/45.79 | 29.93/38.62 |
| Polyester Fabric | | | |
| Water Drop (0 HW/30 HW) | 2/3 | 3/4 | 4/4 |
| Water Spray (0 HW/30 HW) | 60/60 | 95/95 | 90/90 |
| Bundesmann (0 HW/30 HW) | — | 22.70/13.88 | 18.65/21.13 |

The urethane extender provided increased initial water repellency to all wax products when applied to cotton or polyester fabrics. Additionally, performance was maintained over 30 home washings for all blended compositions.

Examples 33-36

Into a 4-neck round bottom flask equipped with an overhead stirrer, thermocouple and condenser was added sorbitan tristearate (55.6 g) sodium carbonate (0.7 g), and MIBK (71.6 g). After the solution was heated to 55° C., DESMODUR N-100 (15.0 g) was added and the temperature was increased to 80° C. Catalyst was added at 80° C. and then reaction temperature was increased to 95° C. After 6 hours, n-butanol (0.9 g) was added to the reaction mixture. The following morning, the reaction tested negative for active isocyanates, and wax was added to the reaction according to the amounts in Table 18.

An aqueous dispersion of the mixture was then prepared. Water (210 g), CHEMIDEX S (1.9 g), ETHAL LA-4 (2.9 g) and dipropylene glycol (22.1 g) were added to a beaker and stirred to form a surfactant solution. The solution was heated to 65° C. The urethane reaction was cooled to 65° C. and the surfactant solution was slowly added to produce a milky solution. The mixture was immersion blended (2 min), homogenized at 6000 psi, and the resulting dispersion was distilled under reduced pressure to remove the solvent. An additional 0.6 g of CHEMIDEX S was added to yield a non-flammable urethane dispersion.

TABLE 18

Wax Composition of Treatment Dispersions

| Example | Wax | Amount (g) |
|---|---|---|
| 33 | Cetearyl methicone | 24.0 |
| 34 | C-30 to C-45 Alkyl Dimethicone | 18.0 |
| 35 | Parafin wax ($T_m$ = 53-57° C.) | 18.0 |
| 36 | Parafin wax ($T_m$ = 58-62° C.) | 18.0 |

Performance Testing

The dispersions were applied to fabrics according to Test Method 1. Padding compositions contained 60 g/L of the solids content of the dispersions. The treated fabric samples were then tested according to Test Methods 2 to 4 after 0 home washes (0 HW) and 30 home washes (30 HW). Home washes were performed according to Test Method 5.

TABLE 19

Performance of Examples 33-36

| | Example | | | |
|---|---|---|---|---|
| | 33 | 34 | 35 | 36 |
| Wax $T_m$ (° C.) | 25-35 | 60-70 | 53-57 | 58-62 |
| Wt. % Ratio of Extender to Wax | 75:25 | 80:20 | 80:20 | 80:20 |
| Cotton Fabric | | | | |
| Water Drop (0 HW/30 HW) | 3/3 | 3/3 | 3/4 | 3/4 |
| Water Spray (0 HW/30 HW) | 100/90 | 100/100 | 100/100 | 100/100 |
| Bundesmann (0 HW/30 HW) | 23.74/58.29 | 15.73/28.58 | 44.40/46.34 | 46.69/45.58 |
| Polyester Fabric | | | | |
| Water Drop (0 HW/30 HW) | 3/3 | 3/3 | 3/4 | 3/4 |
| Water Spray (0 HW/30 HW) | 100/90 | 100/100 | 100/100 | 100/100 |
| Bundesmann (0 HW/30 HW) | 6.08/5.61 | 12.95/8.95 | 11.98/3.85 | 17.01/4.49 |

The urethane extender provided increased initial water repellency to all wax products when applied to cotton or polyester fabrics. Additionally, performance was maintained over 30 home washings for all blended compositions.

It has been found that the method, composition, and treated substrates of the present invention are useful to enhance surface properties, especially durability of oil-, water- and soil-repellency, of the above-described substrates while eliminating the need for fluorinated compounds. The repellency property is more durable than applications of waxes with other extenders, and is effective for various fibrous substrates. The repellency property is also effective with a variety of other surface effects. The treated fibrous substrates of the present invention are useful in a variety of applications such as for textiles, clothing, uniforms, protective garments, furnishings, and the like. The composition blends of the present invention are advantageous in that they give highly durable, low yellowing repellent finishes over a wide range of fibrous substrates while eliminating the need for fluorinated materials.

What is claimed is:

1. A method of treating a substrate comprising contacting the substrate with a composition comprising i) a wax and ii) a polymer extender composition containing 0% unreacted isocyanate groups comprising a compound prepared by:
   (i) reacting (a) at least one isocyanate group-containing compound selected from isocyanate, diisocyanate, polyisocyanate, or mixtures thereof, and (b) at least one isocyanate-reactive compound selected from formula (Ia), (Ib), or (Ic) such that 30 to 100% by mol of the total urethane linkages are from the reaction product of the isocyanate group-containing compound (a) and isocyanate-reactive compound (b):

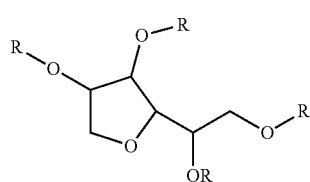
(Ia)

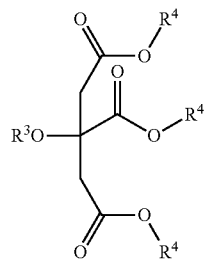
(Ib)

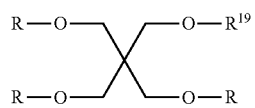
(Ic)

wherein each R is independently —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;

each n is independently 0 to 20;

each m is independently 0 to 20;

m+n is greater than 0;

each R$^1$ is independently a linear or branched alkyl group having 5 to 29 carbons optionally comprising at least 1 unsaturated bond;

each R$^2$ is independently —H, or a linear or branched alkyl group having 6 to 30 carbons optionally comprising at least 1 unsaturated bond; or a mixtures thereof, provided that when the compound is of Formula (Ia) then at least one of R or R$^2$ is —H;

each R$^3$ is independently a —H; —R$^1$; —C(O)R$^1$; —(CH$_2$CH$_2$O)$_{n'}$(CH(CH$_3$)CH$_2$O)$_{m'}$R$^2$; or —(CH$_2$CH$_2$O)$_{n'}$(CH(CH$_3$)CH$_2$O)$_{m'}$C(O)R$^1$;

each R$^4$ is independently —H, a linear or branched alkyl group having 6 to 30 carbons optionally comprising at least 1 unsaturated bond, or combinations thereof; —(CH$_2$CH$_2$O)$_{n'}$(CH(CH$_3$)CH$_2$O)$_{m'}$R$^2$; or —(CH$_2$CH$_2$O)$_{n'}$(CH(CH$_3$)CH$_2$O)$_{m'}$C(O)R$^1$;

each n' is independently 0 to 20;

each m' is independently 0 to 20;

m'+n' is greater than 0;

provided when the compound is Formula (Ib), then at least one R$^2$, R$^3$ or R$^4$ is —H; and each R$^{19}$ is —H, —C(O)R$^1$, or —CH$_2$C[CH$_2$OR]$_3$, provided when the compound is Formula (Ic), then at least one R$^{19}$ or R is —H.

2. A method according to claim 1, wherein the compounds of formulas (Ia), (Ib), and (Ic) are at least 50% bio-based derived.

3. A method according to claim 1, wherein the compounds of formulas (Ia), (Ib), and (Ic) are 100% bio-based derived.

4. A method according to claim 1, wherein the isocyanate group-containing compound is selected from the group consisting of hexamethylene diisocyanate homopolymer, 3-isocyanatomethyl-3,4,4-trimethylcyclohexyl isocyanate, bis-(4-isocyanatocylohexyl)methane and diisocyanate trimers of formulas (IIa), (IIb), (IIc), (IId), and (IIe):

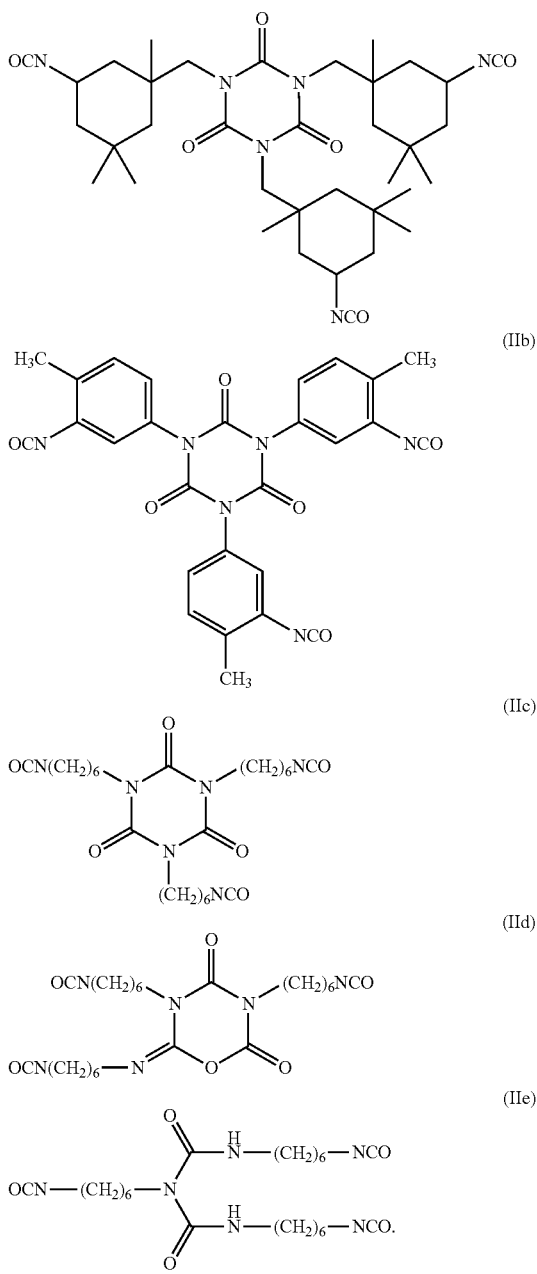

5. A method according to claim 1, wherein the wax is selected from beeswax; microcrystalline wax; oxidized microcrystalline wax; paraffin wax; montan wax; ozokerite wax; carnauba wax; candililla wax; palm wax; whale wax; lanolin; sugar cane wax; sugar esters; polyolefin wax; mono-, di, or tri-glyceride esters; fatty acid ester waxes; or blends thereof.

6. A method according to claim 1, wherein the wax is selected from silicone wax, a blend of silicone waxes, or a blend of silicone wax with at least one non-silicone wax.

7. The method of claim 1 wherein the ratio of the extender composition to the wax is from about 1:10 to about 10:1.

8. The method of claim 1 wherein the composition further comprises a blocked isocyanate.

9. The method of claim 1 wherein the composition further comprises an additive selected from the group consisting of a surfactant, emulsifier, pH adjuster, crosslinker, wetting agent, and softener.

10. The method of claim 1 wherein the substrate is a fiber, textile, fabric, fabric blend, paper, nonwoven, leather or combination thereof.

11. A method according to claim 1, wherein step (i) further comprises reacting (c) at least one second compound of Formula (IIIa)

$$R^5—X \qquad (IIIa),$$

at least one organic compound of Formula (IIIb)

$$R^{15}—(OCH_2CH(OR^{16})CH_2)_z—OR^{17} \qquad (IIIb),$$

or mixtures thereof; wherein $R^5$ is selected from a $—C_1$ to $C_{30}$ linear or branched alkyl optionally comprising at least one unstaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional $C_1$ to $C_{30}$ linear or branched alkyl,

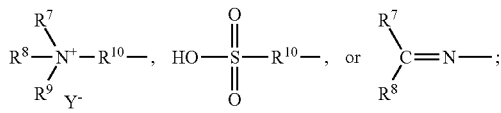

wherein $R^7$, $R^8$, and $R^9$ are each independently, $—H$, $—C_1$ to $C_6$ alkyl, or combinations thereof;
$R^{10}$ is a divalent alkyl group of 1 to 20 carbons;
X is an isocyanate-reactive group selected from $—OH$, $—C(O)OH$, $—SH$, $—NH(R^{12})$, $—O—(CH_2CH_2O)_s(CH(CH_3)CH_2O)_t—H$ or $—[C(O)]—O—(CH_2CH_2O)_s(CH(CH_3)CH_2O)_t—H$;
$R^{12}$ is $—H$ or a monovalent C1 to C6 alkyl group;
$R^{15}$, $R^{16}$, and $R^{17}$ are each independently a $—H$; $—R^{18}$; $—C(O)R^{18}$ provided that at least one $R^{15}$, $R^{16}$, or $R^{17}$ is a $—H$;
$R^{18}$ is independently a linear or branched alkyl group having 5 to 29 carbons optionally comprising at least 1 unsaturated bond;
z is 1 to 15;
Y is $—Cl$;
s is an integer of 0 to 50;
t is an integer of 0 to 50;
s+t is greater than 0.

12. A method according to claim 11, wherein the isocyanate-reactive compound (b) is at least one compound selected from formula (Ia):

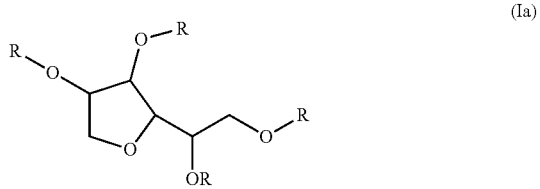

wherein R is independently a $—H$; $—R^1$; or $—C(O)R^1$.

13. A method according to claim 11, wherein (b) is at least one compound selected from formula (Ia):

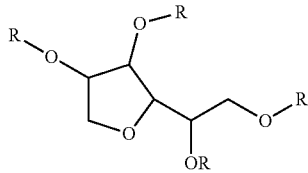

wherein R is independently a —H; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$.

14. A method according to claim 11, wherein the isocyanate-reactive compound (b) is at least one compound selected from formula (Ib):

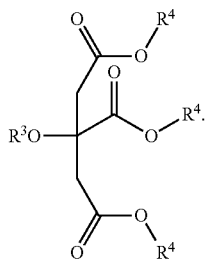

15. A method according to claim 11 wherein the isocyanate-reactive compound (b) is at least one compound selected from formula (Ic):

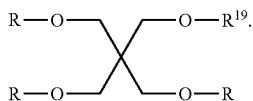

16. A composition for treating a substrate comprising i) a wax and ii) a polymer extender composition containing 0% unreacted isocyanate groups comprising a compound prepared by:

(i) reacting (a) at least one isocyanate group-containing compound selected from isocyanate, diisocyanate, polyisocyanate, or mixtures thereof, and (b) at least one isocyanate-reactive compound selected from formula (Ia), (Ib), or (Ic) such that 30 to 100% by mol of the total urethane linkages of the compound are from the reaction product of the isocyanate group-containing compound (a) and isocyanate-reactive compound (b):

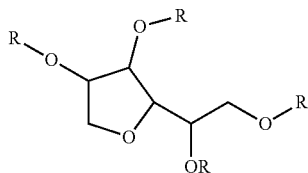

-continued

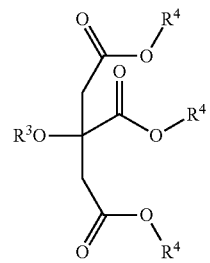

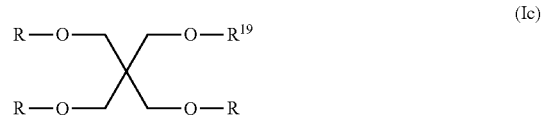

wherein each R is independently —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;

each n is independently 0 to 20;

each m is independently 0 to 20;

m+n is greater than 0;

each R$^1$ is independently a linear or branched alkyl group having 5 to 29 carbons optionally comprising at least 1 unsaturated bond;

each R$^2$ is independently —H, or a linear or branched alkyl group having 6 to 30 carbons optionally comprising at least 1 unsaturated bond;

or a mixtures thereof, provided that when the compound is of Formula (Ia) then at least one of R or R$^2$ is —H;

each R$^3$ is independently a —H; —R$^1$; —C(O)R$^1$; —(CH$_2$CH$_2$O)$_{n'}$(CH(CH$_3$)CH$_2$O)$_{m'}$R$^2$; or —(CH$_2$CH$_2$O)$_{n'}$(CH(CH$_3$)CH$_2$O)$_{m'}$C(O)R$^1$;

each R$^4$ is independently —H, a linear or branched alkyl group having 6 to 30 carbons optionally comprising at least 1 unsaturated bond, or combinations thereof; —(CH$_2$CH$_2$O)$_{n'}$(CH(CH$_3$)CH$_2$O)$_{m'}$R$^2$; or —(CH$_2$CH$_2$O)$_{n'}$(CH(CH$_3$)CH$_2$O)$_{m'}$C(O)R$^1$;

each n' is independently 0 to 20;

each m' is independently 0 to 20;

m'+n' is greater than 0;

provided when the compound is Formula (Ib), then at least one R$^2$, R$^3$ or R$^4$ is —H; and each R$^{19}$ is —H, —C(O)R$^1$, or —CH$_2$C[CH$_2$OR]$_3$, provided when the compound is Formula (Ic), then at least one R$^{19}$ or R is —H.

17. A composition according to claim 16, wherein the compounds of formulas (Ia), (Ib), and (Ic) are at least 50% bio-based derived.

18. A composition according to claim 16, wherein the compounds of formulas (Ia), (Ib), and (Ic) are 100% bio-based derived.

19. The composition of claim 16, wherein the isocyanate group-containing compound is selected from the group consisting of hexamethylene diisocyanate homopolymer, 3-isocyanatomethyl-3,4,4-trimethylcyclohexyl isocyanate, bis-(4-isocyanatocylohexyl)methane and diisocyanate trimers of formulas (IIa), (IIb), (IIc), (IId), and (IIe):

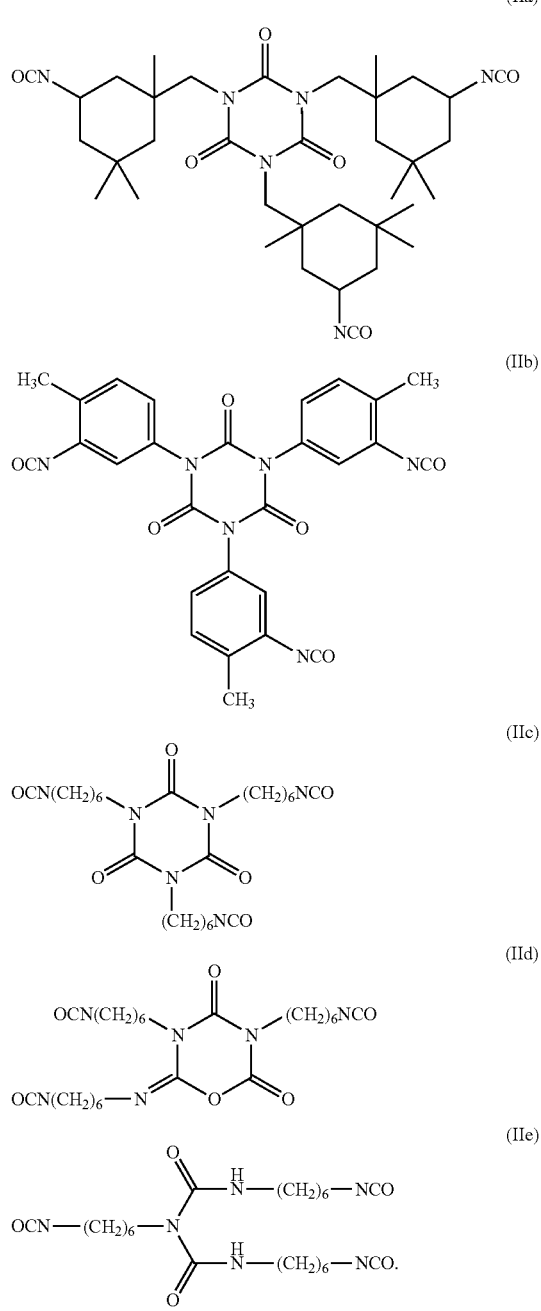

20. The composition of claim 16, wherein step (i) further comprises reacting (c) at least one second compound of Formula (IIIa)

$$R^5-X \qquad (IIIa),$$

at least one organic compound of Formula (IIIb)

$$R^{15}-(OCH_2CH(OR^{16})CH_2)_z-OR^{17} \qquad (IIIb),$$

or mixtures thereof; wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional $C_1$ to $C_{30}$ linear or branched alkyl,

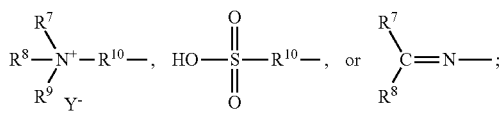

wherein $R^7$, $R^8$, and $R^9$ are each independently, —H, —$C_1$ to $C_6$ alkyl, or combinations thereof;

$R^{10}$ is a divalent alkyl group of 1 to 20 carbons;

X is an isocyanate-reactive group selected from —OH, —C(O)OH, —SH, —NH($R^{12}$), —O—$(CH_2CH_2O)_s$$(CH(CH_3)CH_2O)_t$—H or —[C(O)]—O—$(CH_2CH_2O)_s$$(CH(CH_3)CH_2O)_t$—H;

$R^{12}$ is —H or a monovalent C1 to C6 alkyl group;

$R^{15}$, $R^{16}$, and $R^{17}$ are each independently a —H; —$R^{18}$; —C(O)$R^{18}$ provided that at least one $R^{15}$, $R^{16}$, or $R^{17}$ is a —H;

$R^{18}$ is independently a linear or branched alkyl group having 5 to 29 carbons optionally comprising at least 1 unsaturated bond;

z is 1 to 15;

Y is —Cl;

s is an integer of 0 to 50;

t is an integer of 0 to 50;

s+t is greater than 0.

21. The composition of claim 16, wherein the wax is selected from beeswax; microcrystalline wax; oxidized microcrystalline wax; paraffin wax; montan wax; ozokerite wax; carnauba wax; candililla wax; palm wax; whale wax; lanolin; sugar cane wax; sugar esters; polyolefin wax; mono-, di, or tri-glyceride esters; fatty acid ester waxes; or blends thereof.

22. A composition according to claim 16, wherein the wax is selected from silicone wax, a blend of silicone waxes, or a blend of silicone wax with at least one non-silicone wax.

23. A substrate treated by the method of claim 1.

* * * * *